Aug. 1, 1939.   J. L. HOLY   2,168,213
TRACTOR CULTIVATOR
Filed Sept. 20, 1938   3 Sheets-Sheet 1

Inventor

J. L. Holy

By Clarence A. O'Brien
and Hyman Berman
Attorneys

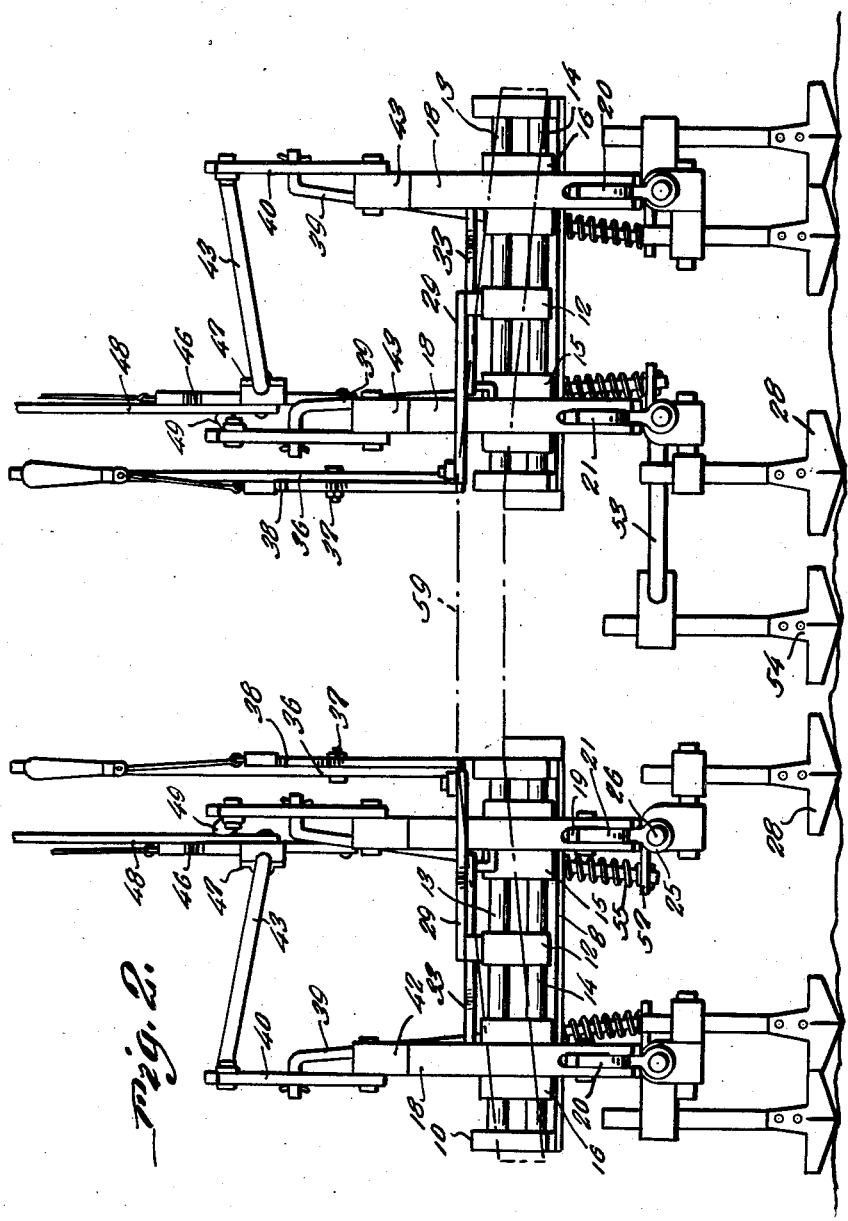

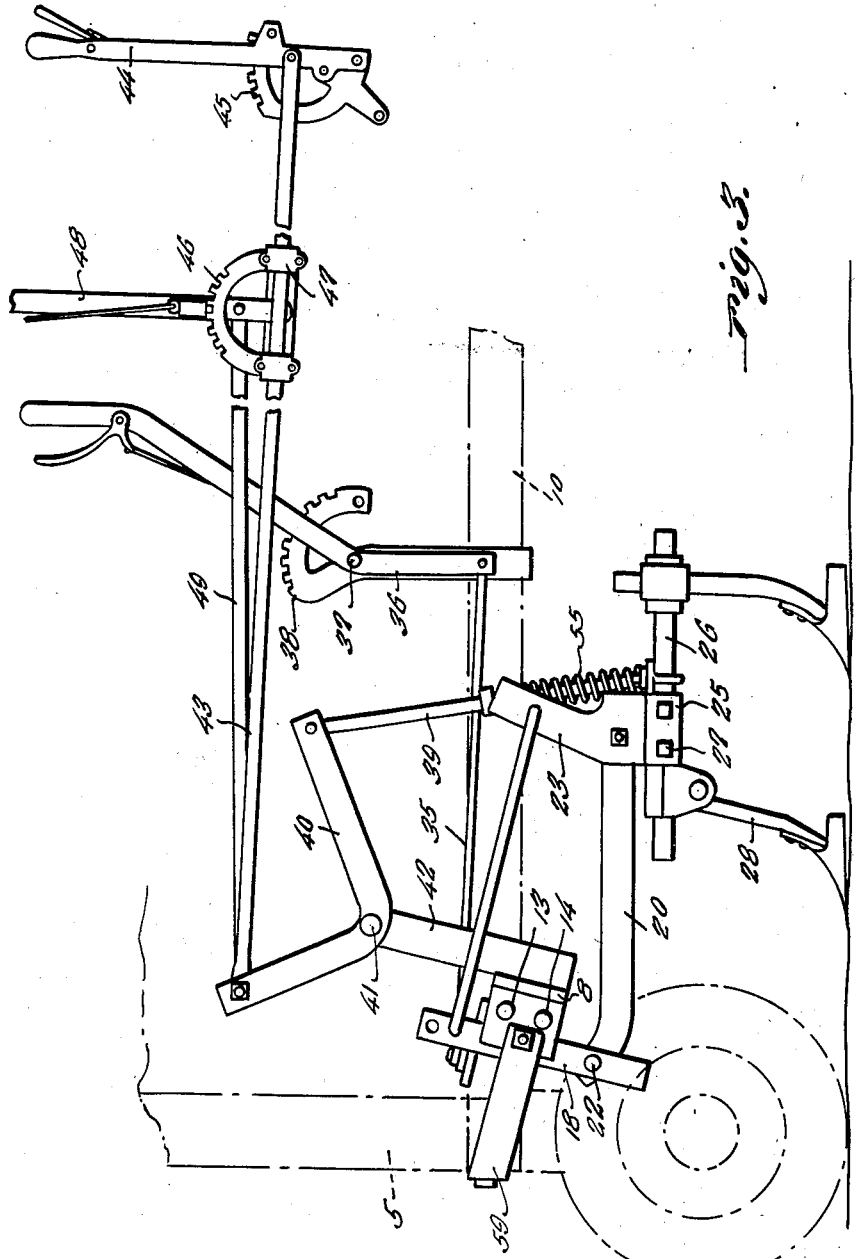

Patented Aug. 1, 1939

2,168,213

UNITED STATES PATENT OFFICE 2,168,213

TRACTOR CULTIVATOR

Joe L. Holy, West, Tex.

Application September 20, 1938, Serial No. 230,863

3 Claims. (Cl. 97—47)

The present invention relates to tractor cultivators and has for its primary object to provide an attachment whereby the operator of the tractor can set the cultivators relative to each other, that is either closer together or farther apart.

A further object of the invention is to provide a pair of cultivator plow units at each side of the tractor having means for adjusting the cultivators of each unit relative to each other in a horizontal direction and also providing means for vertically adjusting each pair of cultivator units simultaneously, or to selectively adjust one of the units of each pair independently of the other.

A still further object is to provide an attachment of this character which may be mounted in operative position upon a tractor of conventional construction without necessitating any material changes or alterations in the construction thereof, which at the same time is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which Figure 1 is a top plan view of the double cultivator unit shown in their relative position for attaching at opposite sides of a tractor.

Figure 2 is a front elevational view and

Figure 3 is a side elevational view.

Figure 4 is a detail of one of the connections for the vertical adjusting rod.

Figure 1:
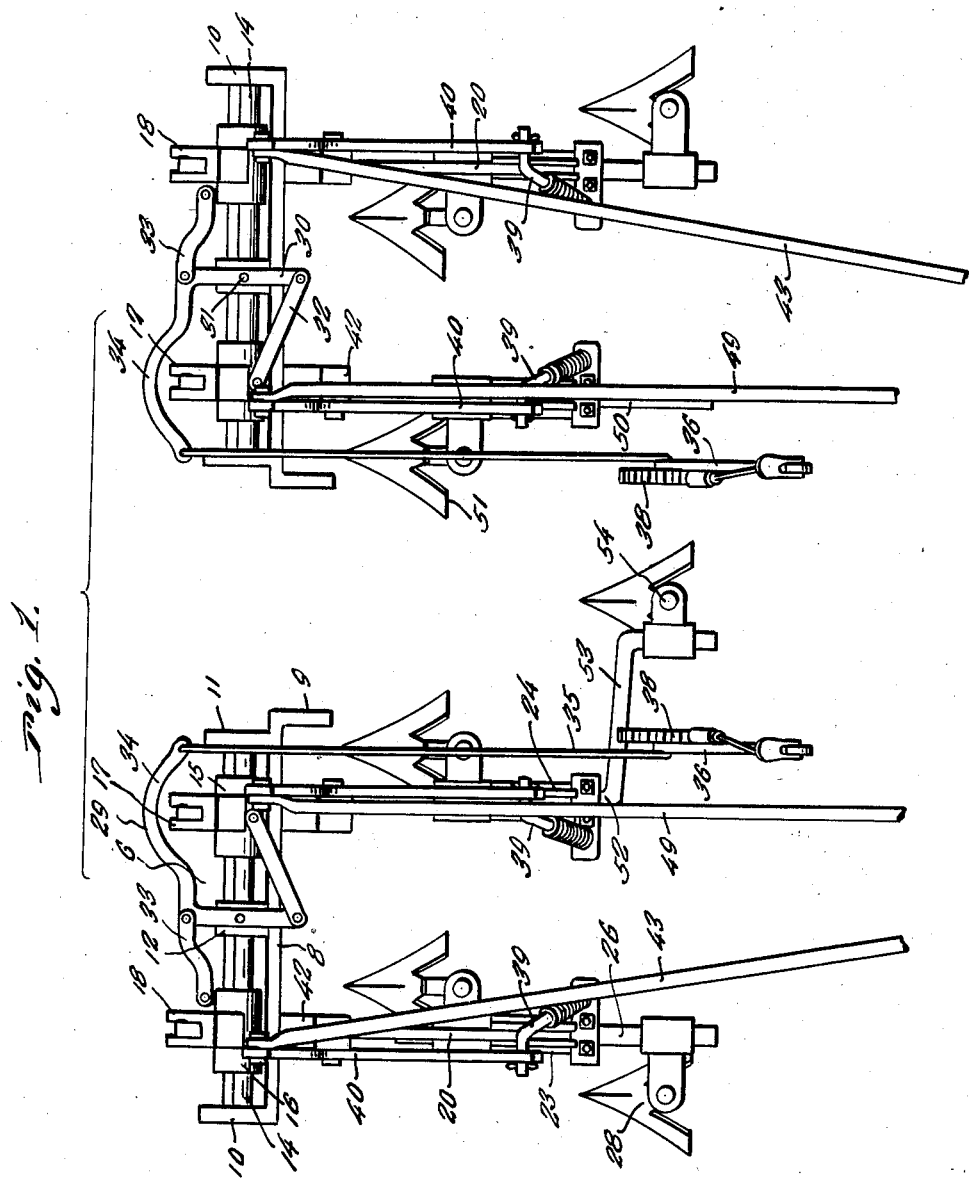

Referring now to the drawings in detail, wherein for the purpose of illustration I have disclosed a preferred embodiment of the invention, the dotted lines designated by the numeral 5 in Fig. 3 represent a fragmentary side elevational view of a conventional type of tractor, to the respective opposite sides of which are positioned the cultivator units designated generally at 6 and 7 in Fig. 1. Each of the units is substantially identical in construction and accordingly a detail description of one will suffice for both.

The cultivator unit comprises an arm 8 extending horizontally laterally outwardly from the side of the tractor and having at its inner end a longitudinally bent attaching bracket 9 for securing to the longitudinal side frame member 10 of the tractor. Each end of the arm 8 is also provided with forwardly extending brackets 10 and 11 and the intermediate portion of the arm is provided with a forwardly extending bracket 12. Each of the brackets 10, 11 and 12 are provided with a pair of openings 13 for receiving a pair of spaced parallel rods 14 which are also positioned in parallelism with respect to the arm 8. Slidably mounted on the rod is an inner carrier 15 and an outer carrier 16 and to which vertical members 17 and 18 are respectively secured intermediate the end portions thereof. The lower end portions of the members 17 and 18 are bifurcated as shown at 19 for receiving the forward ends of beam supports 20 and 21 respectively, the ends of the beam supports being pivotally secured to said members by pins 22.

To the rear ends of the beam support are pivotally secured beam attaching plates 23 and 24 respectively, the lower end of each of the plates 23 being provided with a tubular guide 25 within which the beam 26 is slidably positioned, said beam being in the form of a rod and secured in longitudinally adjusted position to the plates by bolts 27 or the like. To the front and rear ends respectively of the beam are secured the cultivators 28.

Means for adjusting the carriers 15 and 16 relative to each other is provided and comprising a substantially bellcrank spaced lever 29 having one arm 30 pivotally mounted intermediate its ends as at 31 to the bracket 12, the arm 30 extending longitudinally and having its rear end pivotally connected to one end of the link 32, the other end of said link being pivotally connected to the carrier 15. The forward end of the arm 30 is pivotally connected to one end of a link 33 which has its opposite end pivotally connected to the carrier 16. The other end of the arm of the bellcrank lever, designated at 34, extends in a generally inward direction toward the tractor and has its inner end pivotally connected to the front end of a longitudinally extending rod 35, the rear end of the rod being pivoted to the lower end of a lever 36 pivoted intermediate its end as at 37 to a fixedly supported tooth quadrant 38. It will be apparent from the foregoing that through the manipulation of the upper end of the lever 36 the bellcrank lever 29 will be moved about the pivot 31 causing the links 32 and 33 to slide the carriers 15 and 16 in opposite directions, toward or away from each other, as the case may be, thus horizontally adjusting the plows 28.

The cultivators are also adapted for vertical adjustment by means of a rod 39 loosely connected at its lower end to each of the beams and having its upper end pivotally connected to one end of a bellcrank lever 40 which is pivoted intermediate its end as at 41 to a fixedly secured upstanding member 42 having its lower end secured to the arm 8.

To the other end of the bell crank lever 40 is pivotally secured a longitudinally extending rod 43, said rod having its other end pivotally secured to a lever 44 having a fixedly secured quadrant operatively associated therewith. In order to connect the other cultivator beams of each unit for simultaneous vertical adjustment by the lever 44 a quadrant 46 is clamped to the rod 43 as at 47 and a lever 48 is operatively associated with said quadrant and to which a rod 49 is pivotally connected at one end while the other end of the rod is pivotally attached to the bellcrank lever associated with the second cultivator beam of the associated unit. By reason of this construction it will be apparent that while the second cultivator beam may be independently adjusted vertically through the manipulation of the lever 48, that by reason of the fact that the lever is also carried by the rod 43 that both cultivators of each unit will be simultaneously adjusted through the manipulation of the lever 44.

As illustrated in Fig. 1 of the drawings the innermost cultivator beam at the right hand side of the tractor, and designated by the numeral 50, is provided with but a single cultivator 51 while the innermost cultivator beam 52 at the left hand side of the tractor is formed at its rear end with an angular extension 53 adapted to support an additional cultivator 54 at a point intermediate the two sets of cultivators and substantially beneath the center of the tractor.

Each of the rods 39 are provided with a coil spring 55 having its upper end abutting a collar 56 and its lower end abutting a plate 57 secured to the beam by a clamping bolt 58, the rod being slidably inserted through the plate, as shown in Fig. 4, and the spring serving to yieldably urge the cultivator downwardly.

A brace 59 extends transversely across the front of the tractor to support the outer ends of the arms 8.

It is believed the details of construction and manner of operation of the device will be readily understood from the foregoing without further detailed explanation.

What is claimed is:

1. A cultivator attachment for tractors comprising a pair of cultivator units positioned at opposite sides of the tractor, each unit comprising a pair of spaced parallel rods projecting laterally from the side of the tractor, carriers slidably carried by the rods, said rods maintaining the carriers against rotary movement, a cultivator beam secured to each of the carriers and means for adjusting the carriers relative to each other.

2. A cultivator attachment for tractors comprising a pair of cultivator units positioned at opposite sides of the tractor, each unit comprising a pair of spaced parallel rods projecting laterally from the side of the tractor, carriers slidably carried by the rods, said rods maintaining the carriers against rotary movement, a cultivator beam secured to each of the carriers and means for adjusting the carriers relative to each other, said means comprising a bellcrank lever having one part thereof pivotally mounted intermediate its end, links pivotally connected to the respective opposite end of said part and to the respective carriers and actuating means secured to the other part of the bellcrank lever.

3. A cultivator attachment for tractors comprising a pair of cultivator units positioned at opposite sides of the tractor, each unit comprising a U-shaped bracket, a pair of spaced parallel rods carried by the bracket, a collar fixed to the rods intermediate the ends thereof, a pair of carriers slidably mounted on the rods at opposite sides of the collar, a cultivator beam secured to each carrier and means for adjusting the carriers relative to each other and comprising a bellcrank lever pivoted to the collar, a manipulating lever connected to said bell-crank lever and links connecting the carriers to the bell-crank lever at opposite sides of its pivot.

JOE L. HOLY.